United States Patent [19]
Antonius Giesen

[11] Patent Number: 5,358,396
[45] Date of Patent: Oct. 25, 1994

[54] MULTI-FUNCTIONAL MOULD

[75] Inventor: Henricus B. Antonius Giesen, Didam, Netherlands

[73] Assignee: Sony Corporation, Tokyo, Japan

[21] Appl. No.: 94,069

[22] PCT Filed: Jan. 24, 1992

[86] PCT No.: PCT/EP92/00162
§ 371 Date: Sep. 7, 1993
§ 102(e) Date: Sep. 7, 1993

[87] PCT Pub. No.: WO92/12838
PCT Pub. Date: Aug. 6, 1992

[30] Foreign Application Priority Data

Jan. 29, 1991 [BE] Belgium .................. 9100083

[51] Int. Cl.⁵ .............. B29C 45/02; B29C 45/18; B29C 45/26
[52] U.S. Cl. .................. 425/116; 249/102; 264/272.170; 425/183; 425/185; 425/186; 425/190; 425/192 R; 425/544; 425/568; 425/569
[58] Field of Search ............. 425/116, 183, 184, 185, 425/192 R, 544, 588, 568, 569, DIG. 228, 121, 186, 190; 264/272.17; 249/102

[56] References Cited

U.S. PATENT DOCUMENTS

| | | | |
|---|---|---|---|
| 2,279,380 | 4/1942 | Reid | 425/190 |
| 4,077,760 | 3/1978 | Sauer | 425/562 |
| 4,653,995 | 3/1987 | Ward | 425/190 |
| 4,655,274 | 4/1987 | Dannoura | 425/544 |

FOREIGN PATENT DOCUMENTS

| | | | |
|---|---|---|---|
| 0070320 | 1/1983 | European Pat. Off. | |
| 53-35760 | 4/1978 | Japan | 425/544 |
| 63-31728 | 2/1988 | Japan | 425/544 |

OTHER PUBLICATIONS

Rick Paci; "Modern Plastics" vol. 47, No. 7, Jul. 1970, Lausanne CH pp. 102–104; "Now it's easy to convert from transfer to injection molding".

*Primary Examiner*—Khanh Nguyen
*Attorney, Agent, or Firm*—Limbach & Limbach

[57] ABSTRACT

A multi-functional mold which is used for encapsulating chips placed on lead frames is characterized by a chamber arranged in one of the mold halves in which an insert can be replaceably arranged. Depending on the use of the mold in the context of the so-called transfer molding method or injection molding method a different insert is placed in the chamber. In the application as transfer mold the insert includes an elongate member with a bore for guiding a plunger which makes encapsulating material liquid due to the pressure applied thereto and the increasing in temperature. In the application as injection mold the insert includes a member with a through-channel allowing a plasticized encapsulating material coming from a nozzle of an injection molding device to flow into the mold.

12 Claims, 3 Drawing Sheets

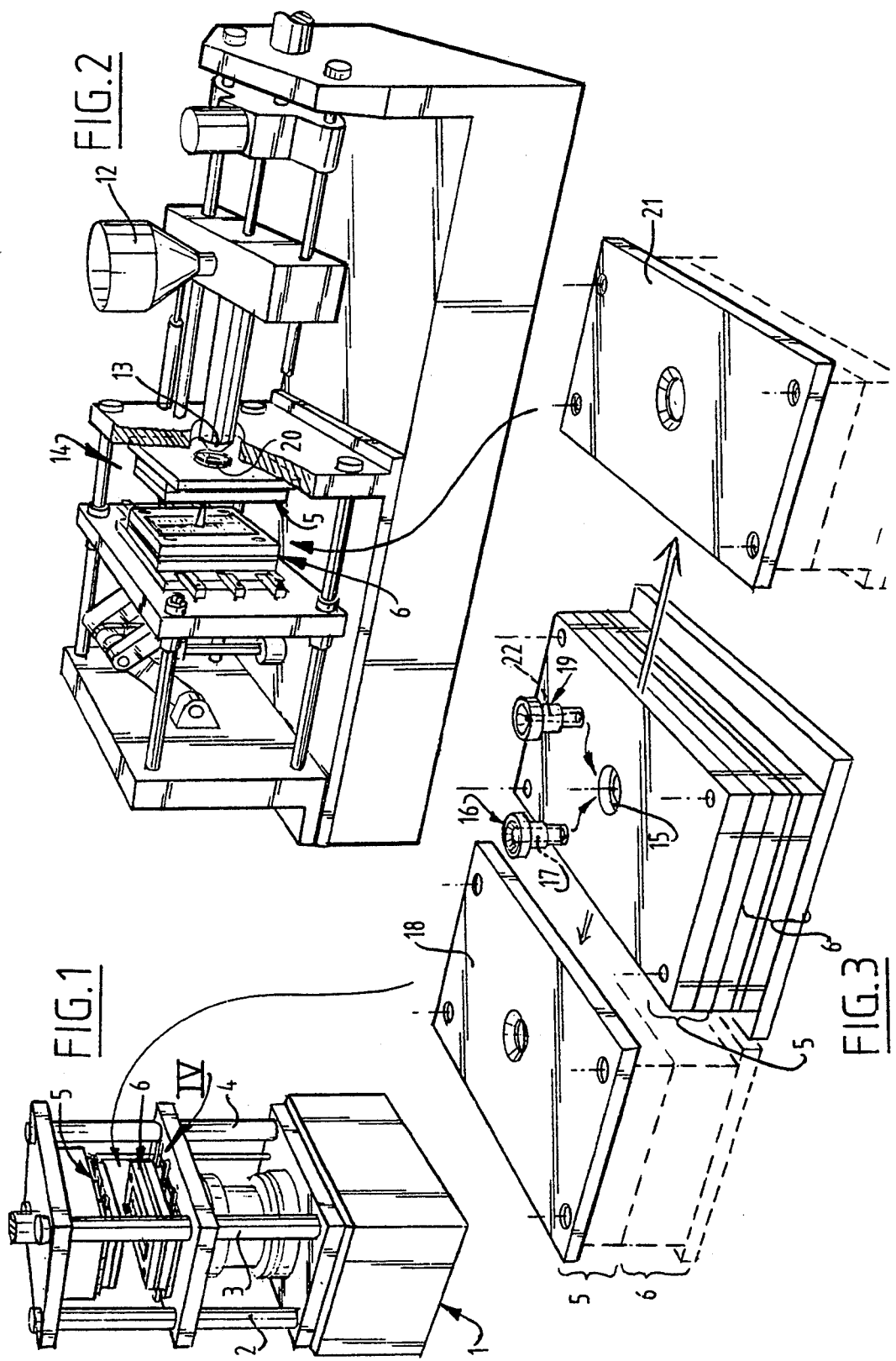

MULTI-FUNCTIONAL MOULD

BACKGROUND OF THE INVENTION

1. Field of The Invention

The invention relates to a multi-functional mould convertable from transfer mould to injection mould, particularly for encapsulating chips placed on lead frames, comprising mutually movable mould halves on the mutually facing surfaces of which cavities are arranged for receiving chips for encapsulating, means for ejecting finished product out of the mould, runners for the passage of encapsulating material to the cavities and a feed opening in one of the mould halves for admitting encapsulating material.

2. Description of the Prior Art

Such a mould is known from Modern Plastics, vol. 47, no. 07, Jul. 1970, Lausanne CH, pages 102–104; R. Paci "Now it's easy to convert from transfer to injection moulding".

Chips arranged on lead frames are normally encapsulated with material by means of the so-called transfer method. An example of such a method and device suitable therefor is described inter alia in the European patent application No. 89.203003.2. With this known method and device a pellet-like piece of encapsulating material is placed in a space suitable for this purpose, pressure is applied on the pellet by means of a plunger and a temperature increase effected such that it becomes liquid and moves through runners suitable therefor to the mould cavities. Materials with a thermosetting character are used as encapsulating material.

In addition to the transfer method, encapsulating material can also be processed as is usual in injection moulding devices. Materials used herein have a thermoplastic character.

The known mould should be machined for conversion of the mould in order to have the means extended. This makes it extremely difficult and cumbersome to reconnect the mould again.

SUMMARY OF THE INVENTION

It is the object of the invention to provide a mould which can be used with both transfer devices and injection moulding devices. This is achieved according to the invention in a multi-functional mould as described in the preamble by a chamber connecting to the feed opening and extending to the cavities for replaceably receiving a chamber connected to the feed opening and extending to the cavities, whereby by only replacing an aggregate in said chamber the mould is converted from transfer moulding to injection moulding or vice versa.

The invention makes it possible by exchanging only an aggregate comprising the insert member and a mounting plate for the mould to be used as desired in a method for encapsulating according to the transfer method or in an injection moulding device. A mould for use as a transfer mould has an insert member with a bore for the passage of a plunger in addition to a mounting plate holding the member fixedly on the mould.

A mould for use as injection mould for connection to an injection moulding device has an insert member with a through-channel and a mounting plate holding the member fixedly on the mould.

The invention will be elucidated with reference to the drawing.

BRIEF DESCRIPTION OF THE DRAWINGS

FIG. 1 shows schematically the arrangement of a mould during application of the transfer method, FIG. 2 shows the arrangement of a mould during application of the injection moulding method, FIG. 3 shows the multi-functional mould according to the invention with dismantled parts.

DESCRIPTION OF THE PREFERRED EMBODIMENT

Figure 4:
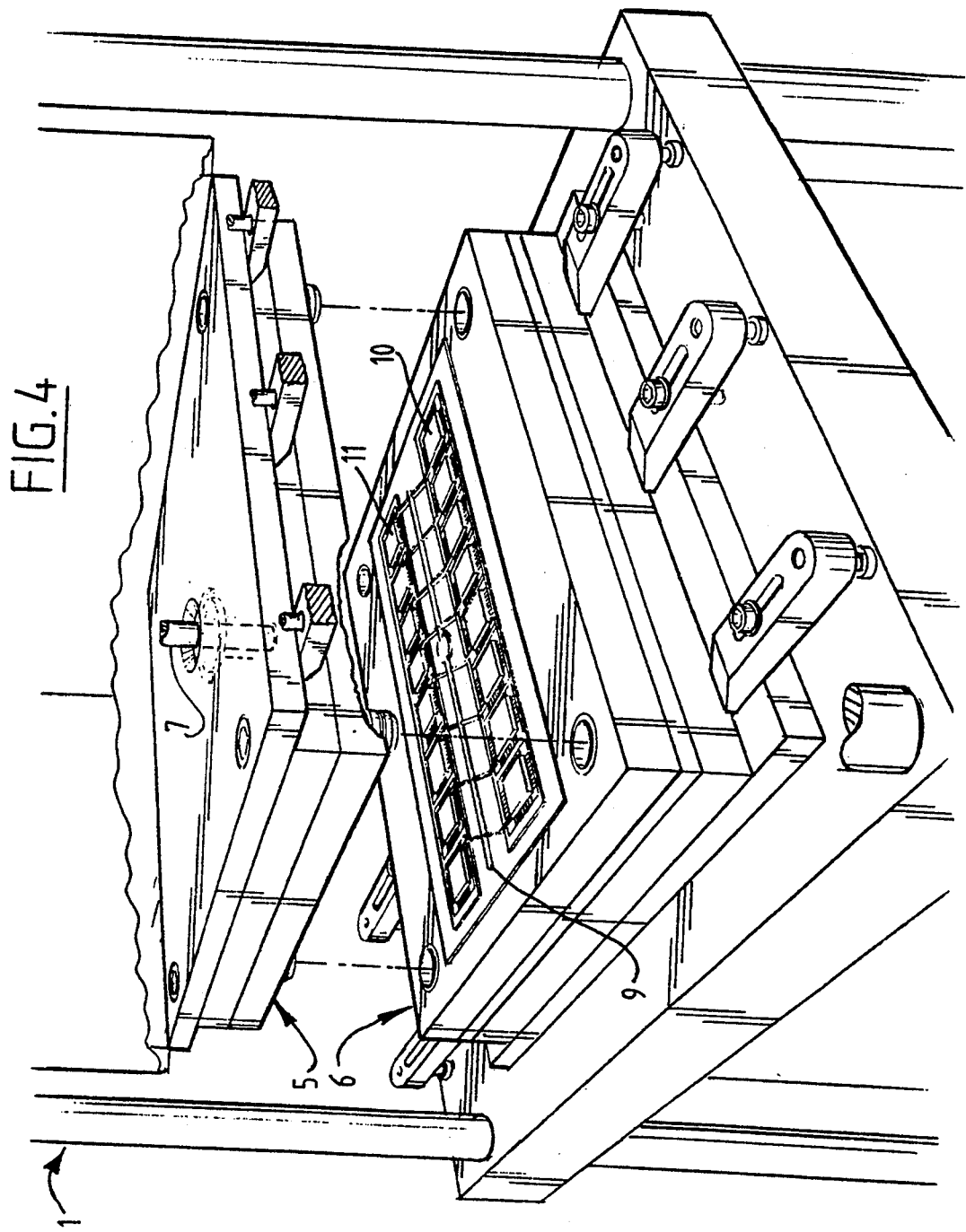
FIG. 4 is a view on a larger scale along the arrow IV in FIG. 1.

The arrangement according to FIG. 1 shows guides 2, 3, 4 placed on a base 1 in the usual manner and control means for mutually displacing mould halves 5 and 6. In the closed situation the plunger 7 (FIG. 4) is displaced in the transfer method whereby due to the pressure exerted and the increase in temperature the pellet-like encapsulating material becomes liquid, moves through runners 9 arranged for this purpose to the chips for encapsulating on the lead frames 10, 11. This is the usual transfer method.

Shown schematically in FIG. 2 is the use of the multi-functional mould according to the invention in an injection moulding device. Encapsulating material is fed from a storage holder 12 to an injection moulding device, heated and plasticized therein and fed via a spray nozzle 13 to the feed opening 20 of the mould 14.

Since injection moulding devices and the operation thereof are generally known, no further mention will be made thereof in this context.

The multi-functional mould according to the invention is shown in FIG. 3. The mould consists of both parts 5 and 6 and has a chamber 15 for receiving an insert member. The latter can be assembled on the one hand from an insert member 16 with a bore 17 for passage of the plunger. In addition a mounting plate 18 is provided. When the member 16 and the mounting plate 18 have been mounted on the mould half 5, the mould is suitable as transfer mould.

To make the mold suitable for use as injection mould the parts 16 and 18 are removed and replaced by the insert member 19 and the mounting plate 21. The member 19 has a through-channel 22 for transport of plasticized encapsulating material to the interior of the mould. The debouchment of the channel 22 has a shape adapted to the injection mould nozzle 13. As seen from the debouchment the channel 22 is divergent to allow break-off of the solidified material to take place at the desired location.

Figure 5:
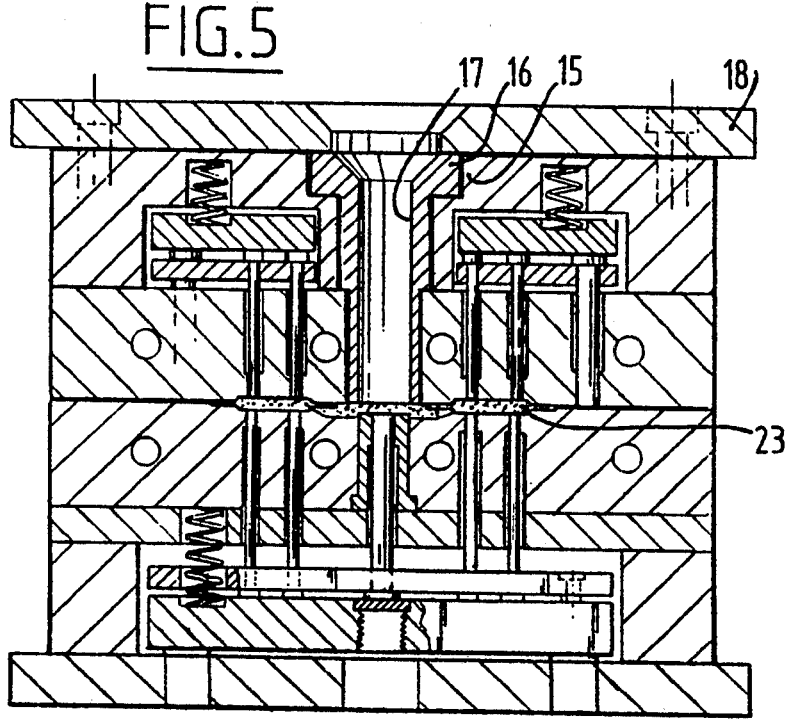
FIG. 5 shows a sectional view of the multi-functional mould according to the invention during use as transfer mould.
Figure 6:
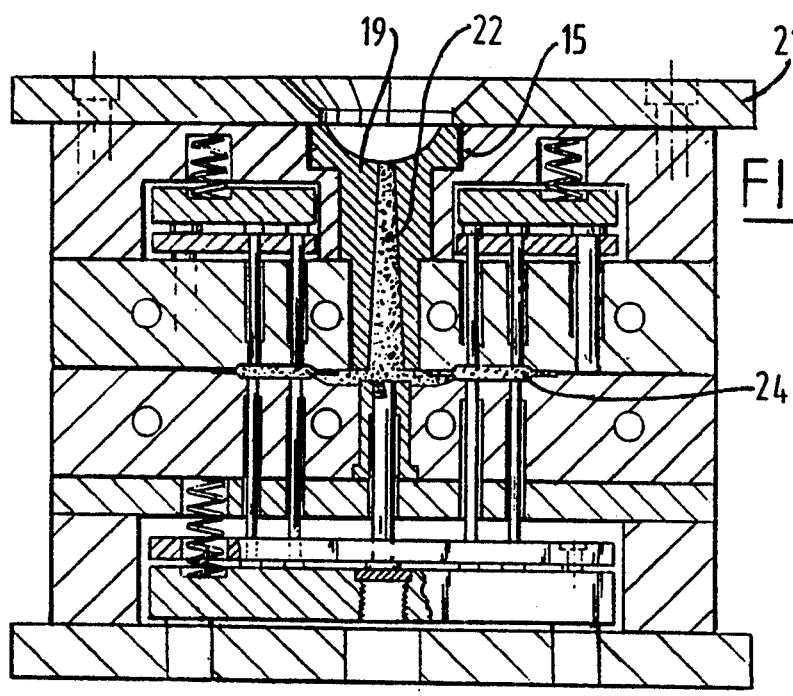
FIG. 6 shows a sectional view of the multi-functional mould during use as injection mould.

FIG. 5 and 6 are sectional views respectively of a mould provided with an aggregate consisting of the parts 16 and 18 and a mould provided with an aggregate consisting of the parts 19 and 21. The moulds are otherwise of normal construction. The mould halves are provided with cavities, for instance 23, 24, for encapsulating chips placed on lead frames.

What is claimed is:

1. A multi-functional mould convertible between transfer moulding and injection moulding for encapsulating chips placed on lead frames, comprising:

mutually movable mould halves having mutually facing surfaces on which cavities are arranged for receiving chips for encapsulating, runners for the passage of encapsulating material to the cavities, a chamber in one of the mould halves and extending to the runners, a replaceable first insert member having a lengthwise bore for communicating with the chamber, the bore of the first insert member being dimensioned to receive a transfer mould apparatus plunger, and a replaceable second insert member having a lengthwise bore for communicating with the chamber, the bore of the second insert member being dimensioned to mate with an injection nozzle of an injection mould, whereby by exchanging the second insert member for the first insert member, the mould is readily convertible from transfer moulding to injection moulding, and by exchanging the first insert member for the second insert member, the mould is readily convertible from injection moulding to transfer moulding.

2. A mould according to claim 1, wherein the first insert member at least partially protrudes into the chamber.

3. A mould according to claim 1, wherein the second insert member at least partially protrudes into the chamber.

4. A mould according to claim 1, further comprising a replaceable first mounting plate mounted on the one mould half and having a through bore for receiving the first insert member.

5. A mould according to claim 1, further comprising a replaceable second mounting plate mounted on the one mould half and having a through bore for receiving the second insert member.

6. A mould according to claim 1, further comprising means for ejecting finished products out of the mould.

7. A mould according to claim 1, wherein the mould is for encapsulating chips placed on lead frames.

8. A multi-functional mould convertible between transfer moulding and injection moulding for encapsulating products, comprising:

mutually movable mould halves having mutually facing surfaces on which cavities are arranged to receive the products for encapsulating, runners for the passage of encapsulating material to the cavities, a chamber in one of the mould halves and extending to the runners, a replaceable insert members having a lengthwise bore for communicating with the chamber, the bore of the insert member being dimensioned to receive one of a transfer mould apparatus plunger or to mate with an injection nozzle of an injection mould, whereby by exchanging the replaceable insert member, the mould is readily convertible from transfer moulding to injection moulding and vice versa.

9. A mould according to claim 8, wherein the replaceable insert member at least partially protrudes into the chamber.

10. A mould according to claim 8, further comprising a replaceable mounting plate mounted on the one mould half and having a through bore for receiving the insert member.

11. A mould according to claim 8, further comprising means for ejecting finished products out of the mould.

12. A multi-functional mould convertible between transfer moulding and injection moulding for encapsulating products, comprising:

mutually movable mould halves having mutually facing surfaces on which cavities are arranged to receive the products for encapsulating, runners for the passage of encapsulating material to the cavities, a chamber in one of the mould halves and extending to the runners, a replaceable insert member having a lengthwise bore for communicating with the chamber, the insert member accommodating one of a transfer mould apparatus plunger or an injection nozzle of an injection mould, whereby by exchanging the replaceable insert member, the mould is readily convertible from transfer moulding to injection moulding and vice versa.

* * * * *